United States Patent
Walter

(10) Patent No.: US 6,265,710 B1
(45) Date of Patent: Jul. 24, 2001

(54) METHOD AND DEVICE FOR EXTRACTING SIGNALS OUT OF A GLASS FIBER

(75) Inventor: Herbert Walter, Zwingenberg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/174,711

(22) Filed: Oct. 19, 1998

(30) Foreign Application Priority Data

Oct. 18, 1997 (DE) ............................................. 197 46 171

(51) Int. Cl.$^7$ ........................................................ G02B 6/24
(52) U.S. Cl. .................. 250/227.11; 385/48; 250/227.14
(58) Field of Search ........... 250/227.11, 227.14–227.18; 385/15, 31, 32, 48; 356/73.1; 359/109, 177

(56) References Cited

U.S. PATENT DOCUMENTS

| | | | |
|---|---|---|---|
| 4,398,794 | * 8/1983 | Palmer et al. | 385/36 |
| 4,618,211 | * 10/1986 | Fleury | 385/48 |
| 4,852,117 | * 7/1989 | Po | 372/6 |
| 6,002,822 | * 12/1999 | Strasser et al. | 385/48 |

FOREIGN PATENT DOCUMENTS 24 09 455   9/1975 (DE).

OTHER PUBLICATIONS

O'Connor et al., "Light scattering in optical waveguides," Applied Optics, vol. 17, No. 20, Oct. 15, 1978, pp. 3226–3231.

E.A.J. Marcatili, "Bends in Optical Dielectric Guides," The Bell System Technical Journal, Sep. 1969, pp. 2103–2132.

Garrett et al., "Components and systems for long–wavelength monomode fibre transmission," Optical and Quantum Electronics 14(1982), pp. 95–143.

\* cited by examiner

Primary Examiner—Stephone B. Allen
(74) Attorney, Agent, or Firm—Kenyon & Kenyon

(57) ABSTRACT

In a method and a device for extracting signals out of a glass fiber without any detectable interference occurring, in particular without the signals propagating through the glass fiber experiencing any transmission loss, light that emerges laterally from the glass fiber due to scattering (Rayleigh scattering) processes, which are in existence anyway, is directed at a photodetector. In the process, the emerging light can be directed by focussing elements at the photodetector or at the input face of another glass fiber. In addition, the emerging light can be directed both directly as well as via at least one reflector at the photodetector.

8 Claims, 1 Drawing Sheet

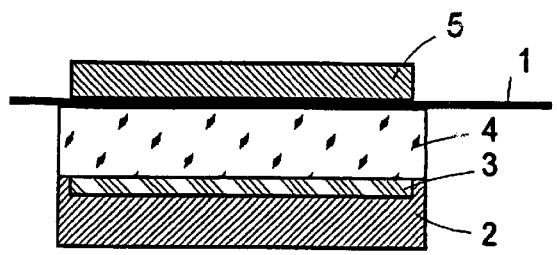
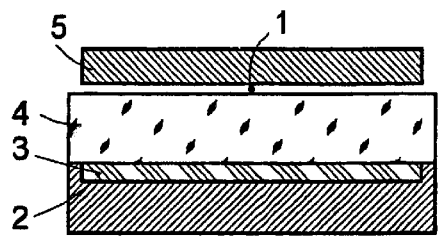
Fig. 1a    Fig. 1b
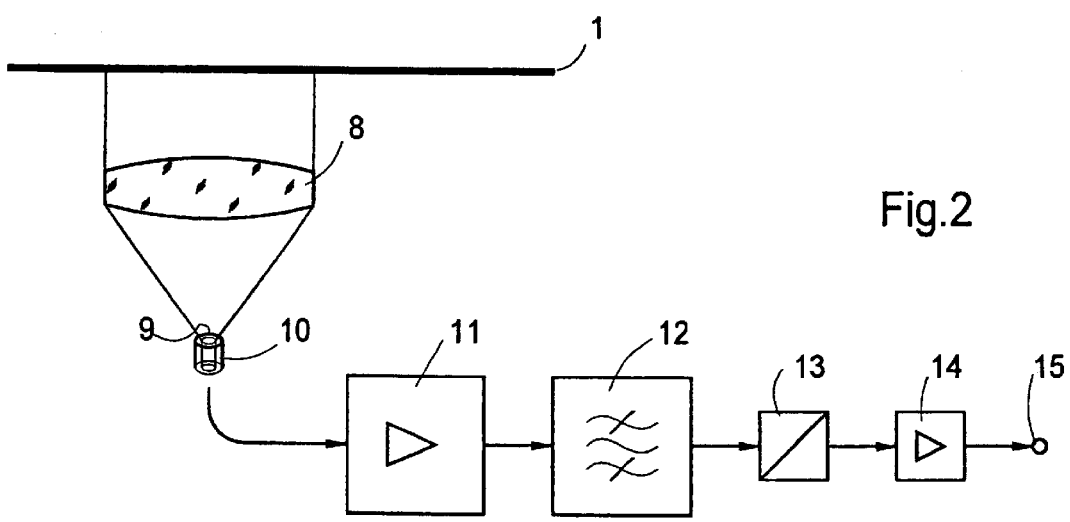
Fig. 2
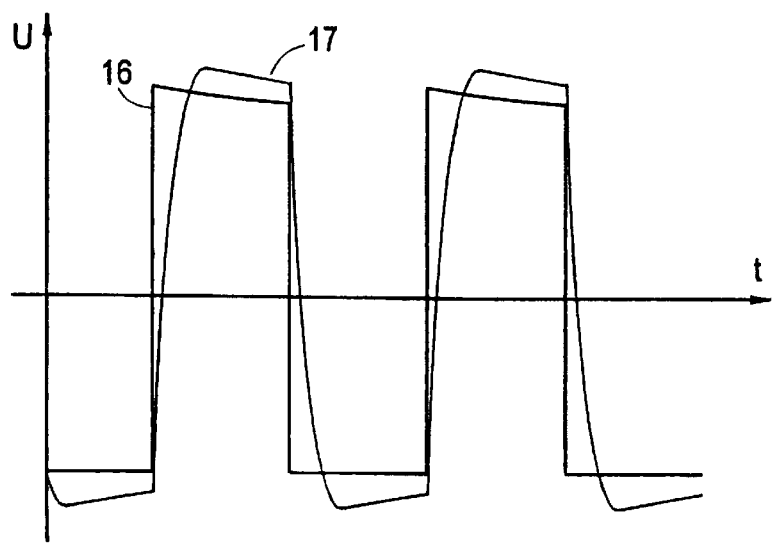
Fig. 3

METHOD AND DEVICE FOR EXTRACTING SIGNALS OUT OF A GLASS FIBER

FIELD OF THE INVENTION

The present invention is generally directed to a method and a device for extracting signals out of a glass fiber without any detectable interference occurring, in particular without the signals propagating through the glass fiber experiencing any transmission loss.

RELATED TECHNOLOGY

Extracting signals out of a glass fiber without any detectable interference occurring, in particular without the signals propagating through the glass fiber experiencing any transmission loss, is needed, for example, to tap selected communication links for purposes of sovereign monitoring (by for example enforcement agencies or intelligence services) or—in the case that the message content is not analyzed—to obtain operational data for the operator of a telecommunications network. In this context, the intention is to couple out a smallest possible portion of the optical power transmitted in the glass fiber, the concept of extraction or signal extraction being used in this connection, whereby it is necessary that the propagation of signals in the direction of the regular receiver not be interrupted, not even for a short term.

Conventional signal extraction methods in known methods heretofore are based on the mode of operation of bending couplers. In this context, a portion of the signal conducted by the glass fiber emerges from the outer rim, i.e., the outer diameter of a curved glass fiber, and is coupled in an appropriate fashion, preferably into another optical waveguide, for example a glass fiber or an integrated optical waveguide.

Alternatively, the extracted signal can also be carried directly to an optoelectric transducer (photodetector). The physical mechanism employed by the process is as follows: the bending causes a portion of the regularly carried mode(s) to be converted into radiation modes. The latter propagate partially in the fiber cladding and in the fiber jacket, and are also partially radiated into external space. Therefore, the portion of the signal remaining in the fiber core is attenuated or suffers a transmission loss.

Extracting signals using bending couplers may be simple and, therefore, easy from a technical standpoint, in principle, however, it is detectable, due to the unavoidable transmission loss caused by the tapping. Such a known method is described in E. A. J. Marcatili, "Bends in Optical Dielectric Guides", The Bell System Technical Journal, pp. 2103–2133, 1969. An optical time-domain reflectometer (OTDR) can be used to measure the magnitude of additional transmission losses produced thereby and to isolate them.

SUMMARY OF THE INVENTION

An object of the present invention is to render possible a signal extraction without the signals propagating through the glass fiber experiencing any detectable interference.

This object is achieved by the fact that light emerging laterally from the glass fiber due to scattering (Rayleigh scattering) processes, which are in existence anyway, is directed at a photodetector.

The so-called Rayleigh scattering means that light emerges laterally out of the glass fiber. Rayleigh scattering is described, for example, in: P. O'Connor, J. Tauc: "Light Scattering in Optical Waveguides", Appl. Opt. 17, pp. 3226–3231, 1978 and in I. Garrett, C. J. Todd: "Review: Components and Systems for Long-Wavelength Monomode Fiber Transmission", Opt. Quantum Electron. 14, pp. 95–143, 1982, which are hereby incorporated by reference herein.

The present invention is based on the realization that the Rayleigh scattering, which is supposed to be as low as possible in the sense of a slightest possible attenuation of the signal propagating through the glass fiber, can be used for signal extraction.

The effect of the measures according to the present invention is able to be substantially enhanced when a greatest possible share of the emerging light can be detected, which is rendered possible in a first advantageous embodiment of the present invention by the fact that the emerging light is directed by focussing elements at the photodetector and, in a second advantageous embodiment, by the fact that the emerging light is directed both directly as well as via at least one reflector at the photodetector.

Another advantageous embodiment of the method of the present invention lies in the fact that the emerging light is directed by focussing elements at an input face of another glass fiber, and arrives via this glass fiber at an erbium amplifier, and that the output signal from the erbium amplifier is fed to the photodetector. This is associated with the advantage that the earlier amplification results in a stronger input signal being fed to the photodetector, so that the inherent noise of the photodetector and of the subsequent amplifier has a less interfering effect.

A device for carrying out the method of the present invention is simply implemented by configuring a photodetector with its light-sensitive surface in a plane that is next to the glass fiber and that runs parallel to the longitudinal direction of the glass fiber. Provision can be made in this context for an antireflection-coated glass pane between the light-sensitive surface of the photodetector and the glass fiber. Moreover, in the case of this device, a reflector can be arranged on the side of the glass fiber facing opposite the photodetector. This further increases the analyzed quantity of light.

Another advantageous device for carrying out the method of the present invention is implemented by arranging an optical element between the glass fiber and the input face of the other glass fiber, the optical element directing a portion of the light emerging laterally from the glass fiber at the input face.

BRIEF DESCRIPTION OF THE DRAWINGS

Exemplary embodiments of the present invention are depicted in the drawings on the basis of several figures and elucidated in the following description, in which:

FIG. 1a shows a longitudinal section view of a first exemplary embodiment;

FIG. 1b shows a cross-section view of the first exemplary embodiment;

FIG. 2 shows a schematic representation of a second exemplary embodiment; and

FIG. 3 shows results of a service test plotted on a voltage over time diagram.

DETAILED DESCRIPTION

In the first exemplary embodiment shown in FIG. 1a as a longitudinal section and in FIG. 1b as a cross-section, provision is made on the one side of a glass fiber 1 for a photodetector 2 having a light-sensitive surface 3, an antireflection-coated glass pane 4 being arranged between glass fiber 1 and photodetector 2. Situated on the other side of glass fiber 1 is a reflector 5, which can be made, for example, of a suitably polished metal plate or of a mirror-coated glass pane. Suited for use as photodetector 2 is a photoelement having an InGaAs base. Service tests were performed using such a photoelement having a 5 mm diameter. It showed satisfactory sensitivity in the 1550 nm wavelength range important for telecommunication applications via glass fibers.

The intensity S of the Rayleigh scattering depends in the following manner on the wavelength of the light signal: $S=k/(lambda)^4$, k being a constant and lambda the wavelength. With an increasing wavelength, the scatter intensity becomes drastically less. Due to this dependency, in the third transmission window that predominates in telecommunications, the scatter intensity is less in the range of the above-mentioned wavelength than in the first and second transmission window. Nevertheless, good results were able to be achieved in service tests, as shown schematically in FIG. 3. In this context, curve 16 shows the control signal which is supplied to a laser and which represents the signal transmitted in the glass fiber, and has a frequency of about 200 Hz. Curve 17 shows the amplified output signal of photodetector 2.

Due to the large capacitance of the photodetector used, the extracted signal shows a perceptible rounding of the edges, while a superimposed noise signal (not shown in FIG. 3) is so small that it has no effect on the further analysis.

In the second exemplary embodiment schematically shown in FIG. 2, a section of glass fiber 1 is imaged via a converging lens 8 onto light input face 9, i.e., onto the core of another glass fiber 10. This glass fiber directs the light to an erbium amplifier 11, from whose output the amplified light is directed via a narrow-band optical filter 12 to a photodetector 13. The filter suppresses noise signals formed in the erbium amplifier and existing outside of the frequency band of the extracted signal. Otherwise, these noise signals would pass into the electrical signal produced by photodetector 13.

The output signal of photodetector 13 is then amplified via as low-noise as possible amplifier 14 and is then available at output 15 for further processing. Appropriate measures for raising the upper cutoff frequency when shunting the signal are known per se. If necessary, the photodetector and the amplifier are cooled to reduce noise.

What is claimed is:

1. A method for extracting signals out of a glass fiber without causing any detectable interference, the method comprising:

directing light emerging laterally from the glass fiber due to scattering at a photodetector.

2. The method as recited in claim 1 wherein the emerging light is directed by focussing elements at the photodetector.

3. The method as recited in claim 1 wherein the emerging light is directed both directly at the photodetector and via at least one reflector at the photodetector.

4. The method as recited in claim 1 wherein the emerging light is directed by focussing elements at an input face of another glass fiber, and further comprising sending the emerging light via the other glass fiber to an erbium amplifier, and feeding an output of the erbium amplifier to the photodetector.

5. A device for extracting signals out of a glass fiber without causing any detectable interference comprising:

a photodetector having a light sensitive surface arranged near the glass fiber in a plane running parallel to a longitudinal direction of the glass fiber.

6. The device as recited in claim 5 further comprising an antireflection-coated glass pane between the light-sensitive surface and the glass fiber.

7. The device as recited in claim 5 further comprising a reflector arranged on a side of the glass fiber opposite the photodetector.

8. The device as recited in claim 5 further comprising another glass fiber having an input face, an optical element and an erbium amplifier arranged between the glass fiber and the photodetector, the optical element being arranged between the glass fiber and the input face, the optical element directing a portion of the emerging light at the input face.

* * * * *